United States Patent
Miyazawa

(10) Patent No.: US 12,333,072 B2
(45) Date of Patent: Jun. 17, 2025

(54) DISPLAY DEVICE FOR VEHICLE

(71) Applicant: YAZAKI CORPORATION, Tokyo (JP)

(72) Inventor: Tomohiro Miyazawa, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 18/886,990

(22) Filed: Sep. 16, 2024

(65) Prior Publication Data

US 2025/0110552 A1    Apr. 3, 2025

(30) Foreign Application Priority Data

Sep. 29, 2023    (JP) ................................ 2023-170276

(51) Int. Cl.
*G06F 3/01*    (2006.01)
*G09G 3/00*    (2006.01)

(52) U.S. Cl.
CPC ............ *G06F 3/013* (2013.01); *G09G 3/001* (2013.01); *G09G 2380/10* (2013.01)

(58) Field of Classification Search
CPC ..... G06F 3/013; G09G 3/001; G09G 2380/10
See application file for complete search history.

(56) References Cited

U.S. PATENT DOCUMENTS

| 2014/0292695 A1* | 10/2014 | Wakamoto | ............ G06F 3/1423 345/173 |
| 2022/0388396 A1* | 12/2022 | Hirata | .................. B60K 35/234 |

FOREIGN PATENT DOCUMENTS

JP    2016-80984 A    5/2016

* cited by examiner

*Primary Examiner* — Matthew A Eason
*Assistant Examiner* — Scott D Au
(74) *Attorney, Agent, or Firm* — KENEALY VAIDYA LLP

(57) ABSTRACT

A display device for vehicle includes an image display unit emitting display light for an image, an optical system projecting the display light emitted from the image display unit toward a reflecting surface forward of a driver, and a control unit controlling the image display unit. The image display unit displays the image of a plurality of designs having the same shape and arranged side by side in a horizontal direction of the driver. The control unit obtains a binocular disparity, which is a displacement amount in the horizontal direction in double images of the image visually recognized by the driver due to a distance difference between a display distance of the image and a gaze point distance of the driver, and adjusts a pitch in the horizontal direction of the designs displayed in the image to be a value obtained by dividing the binocular disparity by an integer.

5 Claims, 5 Drawing Sheets

DISPLAY DEVICE FOR VEHICLE

CROSS-REFERENCE TO RELATED APPLICATIONS

This application is based on and claims priority under 35 USC 119 from Japanese Patent Application No. 2023-170276 filed on Sep. 29, 2023, the entire content of which is incorporated herein by reference.

TECHNICAL FIELD

The present disclosure relates to a display device for vehicle.

BACKGROUND ART

In the related art, there is known a display device for vehicle such as a head-up display for visually recognizing an image as a virtual image from positions of eyes (eyepoint) of a driver. In such a head-up display, as shown in FIGS. 2 and 7, double images may be visually recognized by the driver due to a distance difference between a display distance L1 of the image (virtual image) and a gaze point distance L2 at which the driver gazes. For this reason, the image may be difficult to visually recognize.

As a technique of preventing appearance of double images, a display control device described in JP2016-080984A is proposed. The display control device of JP2016-080984A sets display time of an image to be longer than time required for a dominant eye to completely recognize the image and shorter than time required for a non-dominant eye to completely recognize the image. However, in the technique of JP2016-080984A, the display time of the image is limited.

The present disclosure provides a display device for vehicle in which an image can be visually recognized easily even when double images are visually recognized.

SUMMARY

The present disclosure provides a display device for vehicle includes an image display unit configured to emit display light for an image, an optical system configured to project the display light emitted from the image display unit toward a reflecting surface forward of a driver, and a control unit configured to control the image display unit. The image display unit displays the image of a plurality of designs having the same shape and arranged side by side in a horizontal direction of the driver. The control unit is configured to obtain a binocular disparity, which is a displacement amount in the horizontal direction in double images of the image visually recognized by the driver due to a distance difference between a display distance of the image and a gaze point distance of the driver, and adjust a pitch in the horizontal direction of the designs displayed in the image to be a value obtained by dividing the binocular disparity by an integer.

The present disclosure is briefly described above. Details of the present disclosure can be further clarified by reading modes (hereinafter, referred to as "embodiments") for carrying out the disclosure to be described below with reference to the accompanying drawings.

DESCRIPTION OF EMBODIMENTS

A specific embodiment of the present disclosure will be described below with reference to the drawings.

Figure 1:
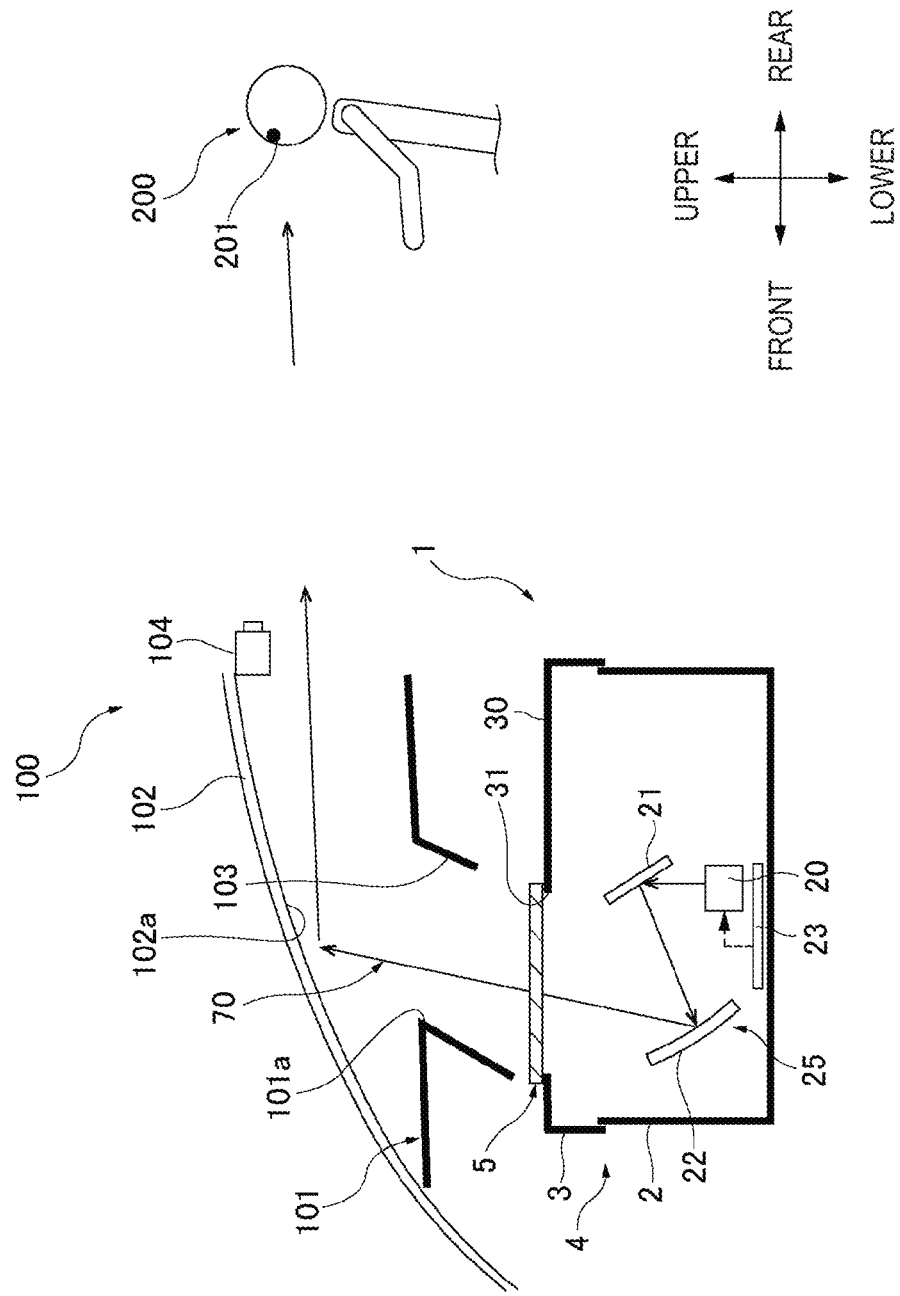
FIG. 1 is a schematic configuration diagram showing a display device for vehicle according to an embodiment.
Figure 2:
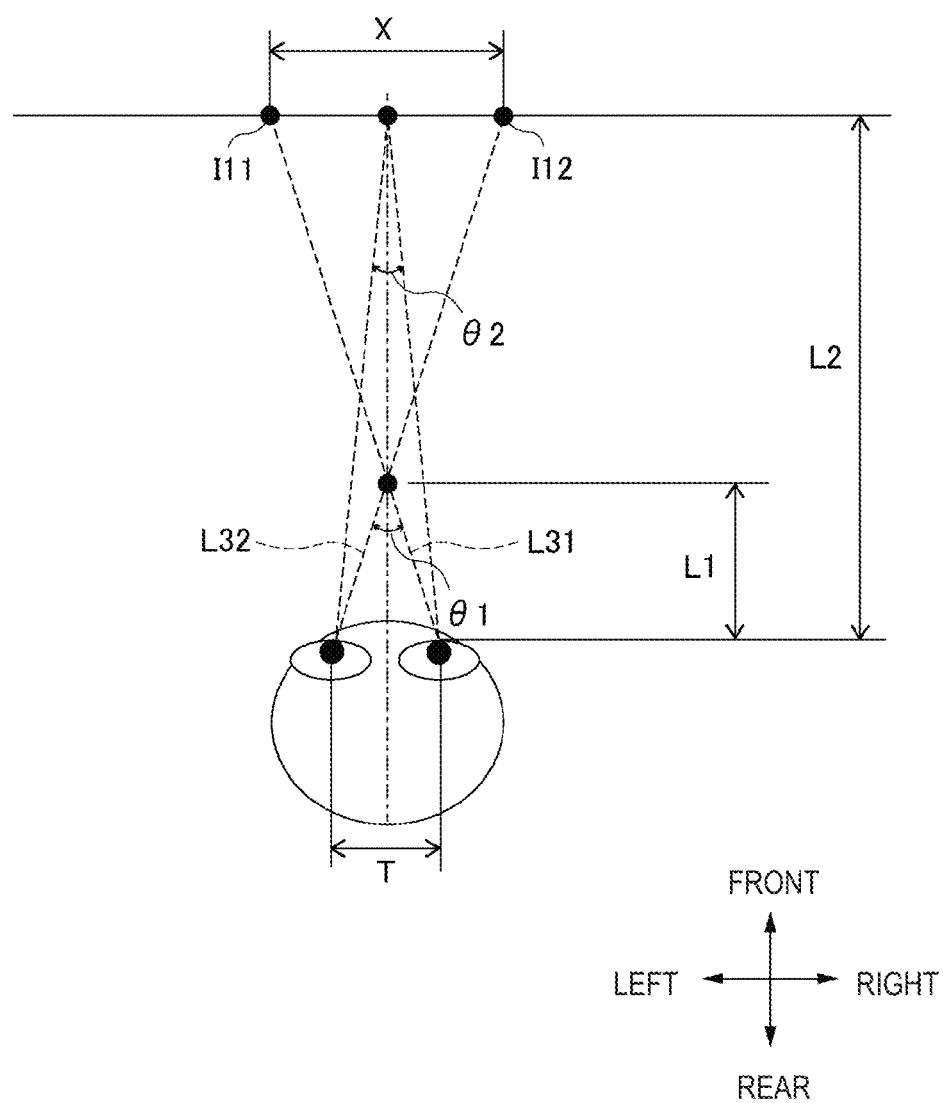
FIG. 2 shows a relationship among eyes of a driver, a display distance of an image displayed on an image display unit shown in FIG. 1, and a gaze distance of the driver.

Hereinafter, for convenience of description, "front", "rear", "left", "right", "upper", and "lower" are defined as shown in FIGS. 1 and 2. A "front-rear direction", a "left-right direction", and an "upper-lower direction" are orthogonal to one another. The left-right direction corresponds to a "horizontal direction" of the present disclosure.

As shown in FIG. 1, a display device for vehicle 1 of the present embodiment is mounted on a vehicle 100 and constitutes a head-up display. The display device for vehicle 1 is disposed, for example, inside an instrument panel 101. The instrument panel 101 has an opening 101a that opens upward. The opening 101a faces a windshield 102 in the upper-lower direction of the vehicle 100.

The display device for vehicle 1 includes a case 4, a cover 5, an image display unit 20, a control unit 23, and an optical system 25. The image display unit 20, the control unit 23, and the optical system 25 are accommodated inside the case 4. The case 4 includes a body 2 and a lid member 3 that engages with the body 2. The body 2 has an opening that opens upward. The lid member 3 closes the opening of the body 2 from above. The lid member 3 includes a wall portion 30 that faces the opening 101a. The wall portion 30 has an opening 31 that opens upward. The case 4 is disposed such that the opening 31 faces the opening 101a. The cover 5 is a plate-shaped member that closes the opening 31 of the lid member 3. The cover 5 is formed of a light-transmissive resin such as polycarbonate (PC) and acrylic.

The image display unit 20 is a device that emits display light 70 for an image. The shown image display unit 20 is a liquid crystal display device, and is, for example, a thin film transistor liquid crystal display (TFT-LCD). However, the image display unit 20 is not limited to the liquid crystal display device. The image display unit 20 may be, for example, a device that generates an image on a transmissive screen by scanning the screen with laser light.

The optical system 25 includes a first mirror 21 and a second mirror 22. The first mirror 21 reflects the display light 70 emitted from the image display unit 20 toward the second mirror 22. The first mirror 21 is, for example, a plane mirror. The second mirror 22 reflects the display light 70 toward the windshield 102. A shape of a reflecting surface of the second mirror 22 is, for example, a free-form surface. The second mirror 22 is, for example, a concave mirror that enlarges the display light 70.

The display light 70 reflected by the second mirror 22 passes through the opening 31 and the opening 101a, and is reflected toward a driver 200 by a reflecting surface 102a of the windshield 102. A virtual image is formed by the display light 70 incident on pupils 201 of the driver 200. The instrument panel 101 is provided with a tubular wall portion 103. The wall portion 103 surrounds an optical path of the display light 70 from the opening 31 toward the opening 101a.

The control unit 23 includes a control circuit that controls the image display unit 20. The control unit 23 is mounted on, for example, a control substrate disposed inside the case 4. The control unit 23 controls the image display unit 20 according to, for example, a program stored in advance to generate an image.

The vehicle 100 includes a driver monitor 104. The driver monitor 104 includes a camera disposed in front of the driver 200. The driver monitor 104 images the driver 200 and generates a driver image. The driver monitor 104 detects positions of the pupils 201 of the driver 200 based on the driver image. A detection result by the driver monitor 104 is sent to the control unit 23.

Figure 7:
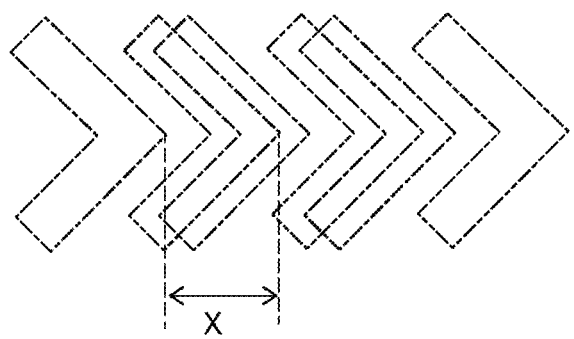
FIG. 7 shows an image visually recognized by a driver in the related art.

An image displayed on the image display unit 20 and visually recognized as a virtual image by the driver 200 may be visually recognized double. This is because, as shown in FIG. 2, when there is a distance difference between a display distance L1 of the image (virtual image) and a gaze point distance L2 (for example, a vehicle 100 m ahead) at which the driver 200 views, a binocular disparity (distance) X is generated in images visually recognized by a right eye and a left eye of the driver 200, respectively. That is, the right eye of the driver 200 visually recognizes a right eye image at an intersection I11 between a line L31 connecting the right eye and the image and the gaze point distance L2. The left eye of the driver 200 visually recognizes a left eye image at an intersection I12 between a line L32 connecting the left eye and the image and the gaze point distance L2. The right eye image and the left eye image are displaced in the horizontal direction. A displacement amount is the binocular disparity (distance) X. For this reason, as shown in FIG. 7, it may be difficult to visually recognize an image since double images displaced due to the binocular disparity (distance) X are displayed. In FIG. 7, a one-dot chain line indicates the right eye image, and a two-dot chain line indicates the left eye image.

Figure 3A:
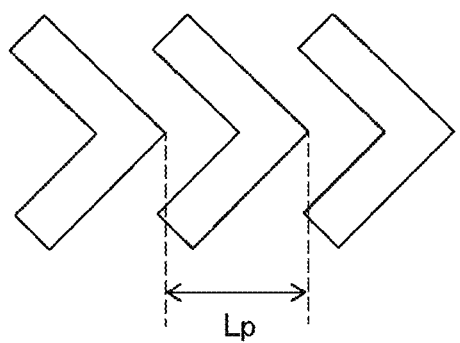
FIG. 3A shows an image displayed on the image display unit shown in FIG. 2.
Figure 3B:
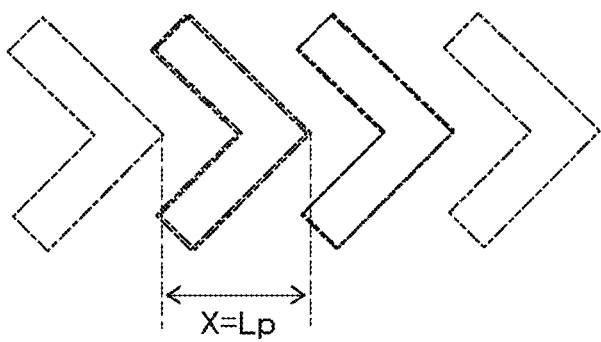
FIG. 3B shows an image visually recognized by the driver when X=Lp.

Accordingly, as shown in FIGS. 3A and 3B, when a plurality of (three in FIGS. 3A and 3B) arrows (patterns) having the same shape are arranged side by side and displayed in the horizontal direction as route change information such as right and left turn, merging, and branching, the control unit 23 adjusts a pitch Lp of the arrows in the horizontal direction to be Lp=binocular disparity (distance) X/integer n. FIG. 3A shows an image displayed on the image display unit 20. FIG. 3B shows an image visually recognized by the driver 200 when the integer n=1, that is, the pitch Lp=binocular disparity (distance) X. In FIG. 3B, a one-dot chain line indicates a right eye image, and a two-dot chain line indicates a left eye image. As shown in FIG. 3B, a leftmost arrow in the left-eye image indicated by the two-dot chain line and a second arrow from right in the right-eye image indicated by the one-dot chain line are displayed in the same position in the horizontal direction and exactly overlap each other. For this reason, the image can be visually recognized easily even when double images are displayed.

Figure 4:
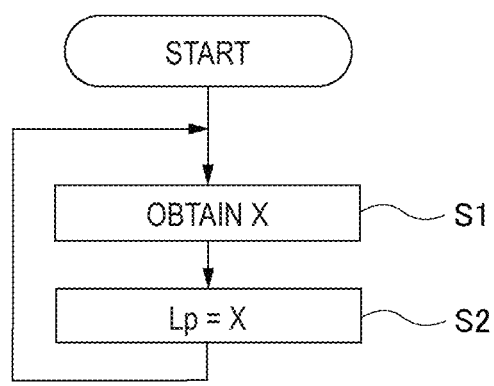
FIG. 4 is a flowchart showing a processing procedure of a control unit shown in FIG. 1.

Thereafter, operation of the control unit 23 described in the above outline will be described with reference to a flowchart in FIG. 4. The control unit 23 communicates with a navigation device, and starts processing at a timing when it is necessary to indicate a direction and an image of three arrows having the same shape and arranged side by side in the horizontal direction as shown in FIG. 3A is displayed. First, the control unit 23 obtains the binocular disparity (distance) X (S1).

In the present embodiment, the binocular disparity (distance) X can be obtained by a following formula (1) as shown in FIG. 2.

$$X = T \times (L2 - L1)/L1 \qquad \text{formula (1)}$$

T: interval between two eyes of the driver 200

Since the interval T between two eyes (see FIG. 2) does not largely differ depending on persons, an average value is stored in advance in a storage unit (not shown) in the present embodiment. Since the display distance L1 can be obtained in advance from an arrangement position of the optical system 25, the display distance L1 obtained in advance is stored in the storage unit in the present embodiment. The gaze point distance L2 can be obtained from a convergence angle θ2 when the driver gazes at the gaze point distance L2 and the interval T between two eyes using a following formula (2).

$$L2 = T/\{2 \times \tan(\theta 2/2)\} \qquad \text{formula (2)}$$

The convergence angle θ2 (see FIG. 2) can be detected from positions of the pupils 201 detected by the driver monitor 104 using a known technique. In the present embodiment, the control unit 23 can detect the convergence angle θ2 at the gaze point distance L2 from the positions of the pupils 201 detected by the driver monitor 104, and substitute the measured convergence angle θ2, the interval T between two eyes stored in the storage unit, and the 20 display distance L1 into the formulas (1) and (2), and obtain the binocular disparity (distance) X. Thereafter, the control unit 23 displays an image in which the pitch Lp is adjusted to be the binocular disparity (distance) X (S2), and returns to S1 again. According to the above operation, the control unit 23 can make the pitch Lp of the arrows equal to the binocular disparity (distance) X, and as shown in FIG. 3B, an image is visually recognized easily even when double images are displayed.

The present disclosure is not limited to the embodiment described above and can be appropriately modified, improved and the like. In addition, materials, shapes, sizes, numbers, arrangement positions and the like of components in the embodiment described above are freely selected and are not limited as long as the present disclosure can be implemented.

In the above-described embodiment, the interval T between two eyes is a predetermined average value, and the present disclosure is not limited thereto. When the driver monitor 104 detects the interval T between two eyes based on a driver image, the interval T between two eyes may be acquired by acquiring a detection result from the driver monitor 104.

Figure 5:
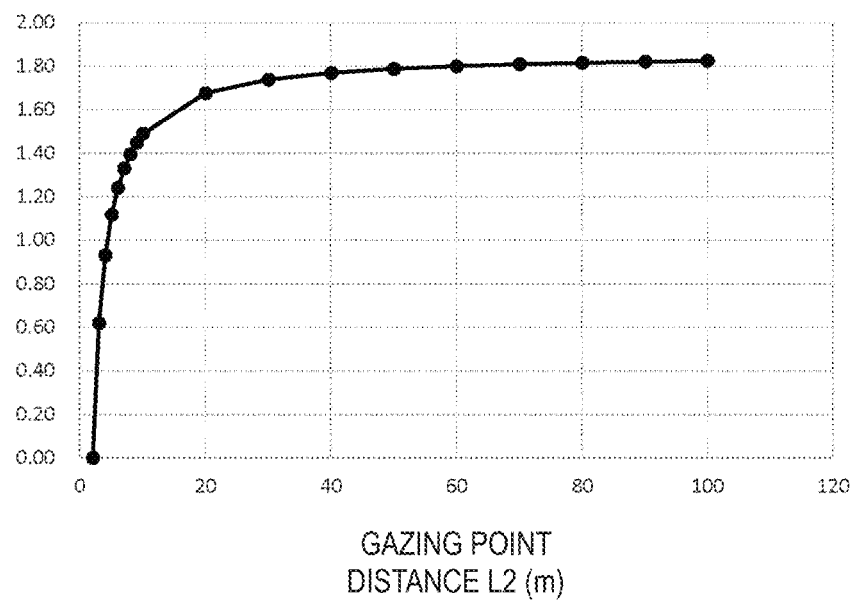
FIG. 5 is a graph showing a relationship between a gaze point distance and a binocular disparity (angle)

In the above-described embodiment, the gaze point distance L2 is obtained from the convergence angle θ2 detected from a driver image of the driver monitor 104, and the binocular disparity (distance) X is obtained from the gaze point distance L2. Alternatively, the present disclosure is not limited thereto. The gaze point distance L2, that is, the convergence angle θ2 changes from moment to moment. A binocular disparity (angle) θ1-θ2, which is a difference between the convergence angle θ2 at the gaze point distance L2 and a convergence angle θ1 (see FIG. 2) at the display distance L1, is as shown in FIG. 5.

The convergence angle θ1 is obtained from a following formula (3). The convergence angle θ2 is obtained from a following formula (4).

$$\theta1 = \arctan\{(T/2)/L1\} \times 2 \qquad \text{formula (3)}$$

$$\theta2 = \arctan\{(T/2)/L2\} \times 2 \qquad \text{formula (4)}$$

FIG. 5 shows a result of calculating the binocular disparity (angle) θ1-θ2 when the interval T between two eyes is set at 65 mm, which is an intermediate of a general interval of 60 mm to 70 mm, the display distance L1 is set at 2 m, and the gaze point distance L2 is changed from 2 m to 100 m.

As shown in the figure, regarding the relationship between the binocular disparity (angle) θ1-θ2 and the gaze point distance L2, a change is large when the gaze point distance L2 is up to 10 m (prescribed distance), and is small when the gaze point distance L2 is 10 m or more. From the formulas (1) and (2), the binocular disparity (distance) X and the binocular disparity (angle) θ1-θ2 are in a proportional relationship. Accordingly, the relationship between the binocular disparity (distance) X and the gaze point distance L2 also changes largely up to 10 m, and small when the gaze point distance is 10 m or more.

When the gaze point distance L2 obtained from the detected convergence angle θ2 is 10 m or more, the control unit 23 may obtain the binocular disparity (distance) X as a predetermined constant value. Accordingly, when the gaze point distance L2 is 10 m or more, even if the gaze point distance L2 changes from moment to moment, the pitch Lp does not change from moment to moment in accordance with the change.

In a case of a vehicle equipped with a sensor that detects a distance to a preceding vehicle, such as an advanced driving assistant system (ADAS), a detection distance of the sensor is input to the control unit 23. The control unit 23 may function as an acquisition unit, acquire the distance to the preceding vehicle as the gaze point distance L2, and obtain the binocular disparity (distance) X. Also in this case, when the distance to the preceding vehicle is 10 m or more, the binocular disparity (distance) X may be a predetermined constant value.

If the navigation device mounted on the vehicle displays a remaining distance to a route change location, the distance is input to the control unit 23. The control unit 23 may function as an acquisition unit, acquire the remaining distance as the gaze point distance L2, and obtain the binocular disparity (distance) X. Also in this case, when the remaining distance is 10 m or more, the binocular disparity (distance) X may be set to be a predetermined constant value.

Figure 6:
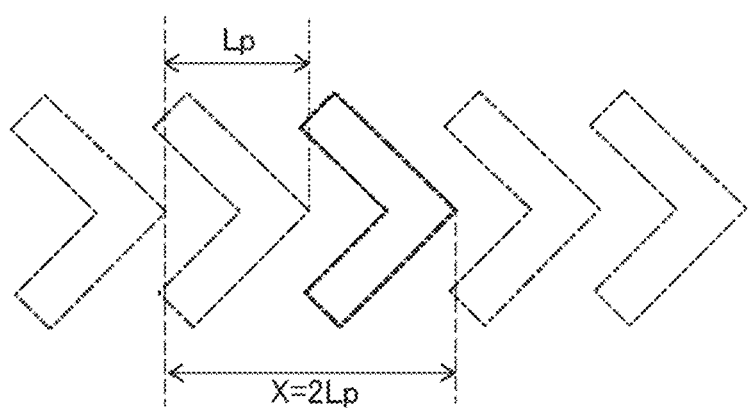
FIG. 6 shows an image visually recognized by the driver when X=2Lp.

Further, in the embodiment described above, the integer n=1 and the pitch Lp=binocular disparity (distance) X, and the present disclosure is not limited thereto. For example, when the binocular disparity (distance) X is large, the integer n may be 2. When the integer n=2, as shown in FIG. 6, a position in the horizontal direction of a rightmost arrow of a right eye image indicated by a one-dot chain line coincides and overlaps exactly with a position in the horizontal direction of a leftmost arrow of a left eye image indicated by a two-dot chain line. Similarly, an image is visually recognized easily even in a case of double images.

In this manner, the integer n may be appropriately set in accordance with a magnitude of the binocular disparity (distance) X.

Here, features of the embodiment of the display device for vehicle according to the present disclosure described above are briefly summarized and listed in following (i) to (v).

(i)
A display device for vehicle (1) including:
an image display unit (20) configured to emit display light (70) for an image;
an optical system (25) configured to project the display light (70) emitted from the image display unit (20) toward a reflecting surface forward of a driver (200); and
a control unit (23) configured to control the image display unit (20), wherein
the image display unit (20) displays the image of a plurality of designs having the same shape and arranged side by side in a horizontal direction of the driver (200), and
the control unit (23) obtains a binocular disparity (X), which is a displacement amount in the horizontal direction (left-right direction) in double images of the image visually recognized by the driver (200) due to a distance difference between a display distance (L1) of the image and a gaze point distance (L2) of the driver (200), and adjusts a pitch (Lp) in the horizontal direction of the designs displayed in the image to be a value obtained by dividing the binocular disparity by an integer (n).

According to the configuration of (i), by adjusting the pitch (Lp) to be the binocular disparity (X)/integer (n), display positions in the horizontal direction of a design of a right eye image and a design of a left eye image constituting the double images are the same and are exactly overlapped. For this reason, the image can be visually recognized easily even when double images are displayed.

(ii)
The display device for vehicle (1) according to (i) further including:
an acquisition unit (23) configured to acquire the gaze point distance (L2) from the driver (200), wherein
the control unit (23) obtains the binocular disparity (X) based on the gaze point distance (L2) acquired by the acquisition unit (23).

According to the configuration of (ii), the binocular disparity (X) can be easily obtained based on the gaze point distance (L2).

(iii)
In the display device for vehicle (1) according to (ii), the control unit (23) obtains a predetermined constant value as the binocular disparity (X) when the gaze point distance (L2) acquired by the acquisition unit (23) is a prescribed distance or more.

According to the configuration of (iii), when the gaze point distance (L2) is the prescribed distance or more, a change amount of the binocular disparity (X) is small. For this reason, when the gaze point distance (L2) is the prescribed distance or more, the pitch (Lp) of the design (arrow) does not change from moment to moment even if the gaze point distance (L2) changes from moment to moment.

(iv)
In the display device for vehicle (1) according to (ii), the acquisition unit (23) acquires a distance to a preceding vehicle as the gaze point distance (L2).

According to the configuration of (iv), it is possible to easily acquire the gaze point distance (L2) and obtain the binocular disparity (X).

(v)

In the display device for vehicle (1) according to (ii), the acquisition unit (23) acquires a remaining distance to a route change location from a navigation device as the gaze point distance (L2).

According to the configuration of (v), it is possible to easily acquire the gaze point distance (L2) and obtain the binocular disparity (X).

What is claimed is:

1. A display device for vehicle comprising:
   an image display unit configured to emit display light for an image;
   an optical system configured to project the display light emitted from the image display unit toward a reflecting surface forward of a driver; and
   a control unit configured to control the image display unit, wherein
   the image display unit displays the image of a plurality of designs having the same shape and arranged side by side in a horizontal direction of the driver, and
   the control unit is configured to obtain a binocular disparity, which is a displacement amount in the horizontal direction in double images of the image visually recognized by the driver due to a distance difference between a display distance of the image and a gaze point distance of the driver, and adjust a pitch in the horizontal direction of the designs displayed in the image to be a value obtained by dividing the binocular disparity by an integer.

2. The display device for vehicle according to claim 1, further comprising:
   an acquisition unit configured to acquire the gaze point distance from the driver, wherein
   the control unit is configured to obtain the binocular disparity based on the gaze point distance acquired by the acquisition unit.

3. The display device for vehicle according to claim 2, wherein
   the control unit is configured to obtain a predetermined constant value as the binocular disparity when the gaze point distance acquired by the acquisition unit is a prescribed distance or more.

4. The display device for vehicle according to claim 2, wherein
   the acquisition unit is configured to acquire a distance to a preceding vehicle as the gaze point distance.

5. The display device for vehicle according to claim 2, wherein
   the acquisition unit is configured to acquire a remaining distance to a route change location from a navigation device as the gaze point distance.

* * * * *